United States Patent [19]
Tsubuko et al.
[11] 4,264,699
[45] Apr. 28, 1981

[54] LIQUID DEVELOPER FOR USE IN ELECTROPHOTOGRAPHY

[75] Inventors: Kazuo Tsubuko, Namazu; Taro Kimura; Tsuneo Kurotori, both of Tokyo, all of Japan

[73] Assignee: Ricoh Co., Ltd., Tokyo, Japan

[21] Appl. No.: 70,456

[22] Filed: Aug. 28, 1979

[30] Foreign Application Priority Data

Aug. 31, 1978 [JP] Japan .............................. 53-105486

[51] Int. Cl.[3] ........................ G03G 9/00; C08L 91/00
[52] U.S. Cl. .............................. 430/112; 260/28.5 R; 260/28.5 A; 430/113; 430/114; 430/137
[58] Field of Search .............................. 430/112–113, 430/114, 115, 116, 117, 137; 260/28.5 R, 28.5 A

[56] References Cited

U.S. PATENT DOCUMENTS

| | | | |
|---|---|---|---|
| 3,997,488 | 12/1976 | Tsubuko et al. | 430/112 |
| 4,060,493 | 11/1977 | Tsubuko et al. | 430/112 |
| 4,081,391 | 3/1978 | Tsubuko et al. | 430/114 |
| 4,104,183 | 8/1978 | Tsubuko et al. | 430/114 |
| 4,181,620 | 1/1980 | Tsubuko | 430/114 |

*Primary Examiner*—Mary F. Downey
*Attorney, Agent, or Firm*—Blanchard, Flynn, Thiel, Boutell & Tanis

[57] ABSTRACT

A liquid developer for use in electrophotography which is prepared by dispersing a pigment or dye and a resin in a carrier liquid comprising a nonaqueous solvent having a high insulating property and a low dielectric constant, wherein said resin comprises those obtained by grafting, upon a copolymer comprising a monomer having the general formula

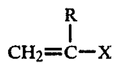

[wherein R is —H or —$CH_3$ and X is a phenyl group, a methylphenyl group, —$COOC_nH_{2n+1}$ ($1 \leqq n \leqq 20$) or —$COOC_2H_4N(C_mH_{2m+1})_2$ ($1 \leqq m \leqq 5$)], a monomer having a glycidyl group and a unsaturated carboxylic acid or its anhydride, in particular the unsaturated carboxylic acid or its anhydride when the copolymer has the glycidyl group as the constitution unit, and the monomer having a glycidyl group when the copolymer has the unsaturated carboxylic acid or its anhydride as the constitution unit.

8 Claims, No Drawings

LIQUID DEVELOPER FOR USE IN ELECTROPHOTOGRAPHY

BACKGROUND OF THE INVENTION

1. Field of the Invention

The present invention relates to a liquid developer for use in electrophotography, in particular an improved liquid developer which is prepared by dispersing a toner consisting essentially of a pigment or dye and a specific non-aqueous resin dispersion uniformly in a carrier liquid having a high insulating property and a low dielectric constant.

2. Description of the Prior Art

It has been broadly utilized for developing a electrostatic latent image to make toner particles travel across the area to be developed and attached to the latent image area having a fixed polarity. Latent images may be formed by means of a variety of methods. The most popular method is one utilizing the surface of an electrophotoconductive plate whose insulating layer contains, dispersed and embedded therein, photoconductors such as zinc oxide and the like, which comprises electrifying the said surface by means of corona discharge or another process equivalent thereto, projecting light image on the surface for dissipating the electric charge present in the light-radiated area, and thus forming an electrostatic latent image.

In some cases, X-rays are utilized to bring about a change in the electric charge for the formation of the latent image, and in some methods another surface different from the photoconductive surface is treated according to the principle that the light image brings about a change in the electric charge to thereby form a similar latent image.

The thus electrostatic latent image-formed surface is developed by means of the following toner particle-containing suitable developer. Development has been usually effected by allowing powder-shaped dry toner particles or powder-shaped dry toner particles carried on coarse carrier particles to flow across the latent image-carrying surface and attaching toner particles to the latent image area. However, wet development using a liquid developer is now widely employed to meet the strong demand for high resolving power.

General liquid developers are prepared by incorporating toner particles in a carrier liquid having an insulating property to such an extent as not to destroy a latent image (wherein the electric resistance is more than $10^9\Omega\cdot$cm and the dielectric constant is less than 3), and according to some improvement achieved in this field, toner particles are provided with controlling surfaces for the control of toner particles per se.

However, such conventional liquid developers were defective in that because the resin and/or the polarity controlling agent constituting the toner diffuse and dissolve in the carrier liquid with the lapse of time, the polarity becomes indistinct, whereby the image density and the fixability are deteriorated, ground contamination is increased and so forth with the result being that copied images poor in sharpness are obtained. In addition, because the printing durability is low and the change of developers with the lapse of time is large there can not be obtained images having high concentration.

Still further, such conventional developers, once the toner agglomerates, are difficult to re-use, because it is impossible to re-disperse the agglomerated toner. Due to these deficiencies, such conventional liquid developers were not suitably used for offset printing or transfer such as charge transfer, press transfer, magnetic transfer and the like.

SUMMARY OF THE INVENTION

It is a primary object of the present invention to provide a liquid developer for use in electrophotography which substantially alleviates the foregoing defects of conventional liquid developers and which is characterized by excellent control for sedimentation and settlement of toner particles. And it is another object of the present invention to provide a liquid developer for use in electrostatic photography which improves the adhesive property of the toner and permits the production of copied images of sharp color tone.

That is, in accordance with the present invention, there is provided a developer for use in electrostatic photography which is prepared by dispersing a pigment or dye and a resin as principal components in a carrier liquid comprising a nonaqueous solvent having a high insulating property and a low dielectric constant, characterized in that said resin is obtained by grafting, upon a copolymer of a monomer having the general formula $$CH_2{=}\overset{\displaystyle R}{\overset{|}{C}}{-}X$$

[wherein R is —H or —$CH_3$ and X is a phenyl group, a methylphenyl group, $COOC_nH_{2n+1}$ ($1\leq n\leq 20$) or —$COOC_2H_4N$ $(C_mH_{2m+1})_2$ ($1\leq m\leq 5$)], a monomer having a glycidyl group and an unsaturated carboxylic acid or its anhydride, the unsaturated carboxylic acid or its anhydride being used when the copolymer has the glycidyl group as the constitution unit, and the monomer having a glycidyl group when the copolymer has the unsaturated carboxylic acid or its anhydride as the constitution unit.

DETAILED DESCRIPTION OF THE INVENTION

Hereinafter, the present invention will be explained in more detail. As the nonaqueous solvent used in the present invention there can be enumerated those homogenous to the carrier liquid, i.e. petroleum type aliphatic hydrocarbons, n-hexane, ligroin, n-heptane, n-pentane, isododecane, isoctane, etc., and in addition thereto, their halogen derivatives, for instance, such as carbon tetrachloride, perchloroethylene, etc. each of them having a high insulating property (wherein the electric resistance is more than $10^9\Omega\cdot$cm) and a low dielectric constant (wherein the dielectric constant is less than 3). The aforesaid petroleum type aliphatic hydrocarbons are commercially available as Isopar E, Isopar G, Isopar L, Isopar H, Isopar K, Naphtha No. 6, Solvesso 100, etc., manufactured by Exxon Company. These may be used solely or jointly.

And the pigment or dye which may be used in the toner of the present invention can include hitherto well known ones, for instance, such as Alkali Blue, Phthalocyanine Green, Oil Blue, Spirit Black, carbon black, Oil Violet, Phthalocyanine Blue, Benzidine Yellow, Methyl Orange, Brilliant Carmine, Fast Red, Methyl Violet and so forth.

The monomer having the General formula (1) can include vinyl monomers, for instance, such as stearyl-, lauryl-, tridecyl-, 2-ethylhexyl- or hexylester of acrylic acid or methacrylic acid; t-butylmethacrylate; cetylmethacrylate; octylmethacrylate; vinylstearate, etc.

As the monomer having a glycidyl group there can be enumerated glycidyl methacrylate, glycidyl acrylate, etc. And the unsaturated carboxylic acid which may be used in the present invention can include acrylic acid, methacrylic acid, fumaric acid, crotonic acid, maleic acid, etc.

In the actual preparation of this graft resin, a mixture of the monomer having the general formula (1) with glycidyl(meth)acrylate, unsaturated carboxylic acid or unsaturated carboxylic acid anhydride (whose weight ratio is 99.9–80:0.1–20) is first heated to 70°–150° C. for reaction in the aliphatic hydrocarbon in the presence of a polymerization catalyst such as azobisisobutyronitrile. Next, this reaction liquid is admixed with glycidyl(-meth)acrylate, unsaturated carboxylic acid or its anhydride (unsaturated carboxylic acid or its anhydride when the copolymer has glycidyl(meth)acrylate as the constitution unit, and glycidyl(meth)acrylate when the copolymer has unsaturated carboxylic acid or its anhydride as the constitution unit) in the proportion of 0.1–20 parts by weight per 100 parts by weight of the copolymer resulting from the previous thermal reaction, and the same is heated to 70°–150° C. for reaction in the presence of a graft catalyst such as sulfuric acid, paratoluene sulfonic acid, tertiary amine compound, or the like, whereby the graft resin can be obtained.

Hereinafter, there will be enumerated some preparation examples of the aforesaid graft resin.

PREPARATION EXAMPLE-1

300 g of isooctane were put in a 20 l three-way flask equipped with a stirrer, a thermometer and a reflux condenser and heated to 90° C. On the other hand, there was prepared a mixture consisting of 150 g of lauryl methacrylate, 3 g of methacrylic acid, 20 g of styrene and 5.0 g of lauryl peroxide. This mixture was added dropwise thereto for two hours and stirred at about 90° C. for 3 hours. To this resinous solution were further added 5.8 g of glycidyl acrylate and 0.3 g of sulfuric acid and the same was subjected to reaction at 85° C. for 10 hours. The resulting resinous dispersion was calculated: Polymerization degree, 94.5%; Acid value, 18.2; and Viscosity, 82 cp. (centi-poises).

PREPARATION EXAMPLE-2

300 g of isooctane were put in the same three-way flask as Preparation Example-1 and heated to 90° C. On the other hand, there was prepared a mixture consisting 150 g of styrene, 4 g of maleic acid and 3 g of azobisisobutyronitrile. This mixture was added dropwise thereto at 90° C. for 1 hour for polymerization.

Next, 10 g of glycidyl acrylate and 1 g of paratoluene sulfonic acid were further added thereto and subjected to reaction at 85° C. for 12 hours. These obtained resinous dispersion was calculated: Polymerization degree, 92.9%; Acid value, 14.5; and Viscosity, 50 cp.

PREPARATION EXAMPLE-3

250 g of Isopar-G, 150 g of lauryl methacrylate, 3 g of acrylic acid, and 3 g of benzoyl peroxide were put in the same three-way flask as Preparation Example-1 and the same was subjected to reaction at 90° C. for 3 hours (A). On the other hand, 250 g of Isopar-G, 150 g of lauryl methacrylate, 4 g of glycidyl methacrylate and 3 g of benzoyl peroxide were put in the same three-way flask as Preparation Example-1 and the same was subjected to reaction at 90° C. for 3 hours (B).

These reaction products (A) and (B) were mixed in the same flask, 0.5 g of lauryl dimethylamine was further added thereto, and then the same was subjected to reaction at 85° C. for 13 hours. The resulting resinous dispersion was calculated: Polymerization degree, 96.5%; Acid value, 14.8; and Viscosity, 85 cp.

PREPARATION EXAMPLE-4

300 g of toluene, 150 g of methyl methacrylate, 10 g of glycidyl methacrylate, and 3 g of benzoyl peroxide were put in the same flask as Preparation Example-1 and the same was subjected to polymerization reaction at 90° C. for 3 hours. Next, 8 g of fumaric acid and 0.05 g of triethylamine were further added thereto, and the same was subjected to reaction at 80° C. for 10 hours. The resulting resinous dispersion was calculated: Polymerization degree, 93.8%; Acid value, 18.2; and Viscosity, 63 cp.

PREPARATION EXAMPLE-5

150 g of stearyl methacrylate was employed in place of the same quantity of the methyl methacrylate used in Preparation Example-4. The resulting resinous dispersion was calculated: Polymerization degree, 94.4%; Acid value, 18.6; and Viscosity, 93 cp.

PREPARATION EXAMPLE-6

Polymerization reaction was effected by using the same quantity of water in place of the toluene used in Preparation Example-4. The resulting resinous dispersion was calculated: Polymerization degree, 96.9%; Acid value, 17.3; and Viscosity, 79 cp.

The liquid developer of the present invention can be prepared by dispersing 0.1–10 parts by weight of pigment or dye per part by weight of the graft copolymer obtained as aforesaid in a proper quantity of a carrier liquid (which is identical with the nonaqueous solvent) by means of a dispersor such as three-roll mill, attritor, ball mill or the like to thereby form a concentrated toner, and diluting the resulting toner with a fixed quantity of a carrier liquid. In this case, the addition of a very small quantity of a polarity controlling agent may be made as occasion demands, but in view of the resin used in the present invention being of a high polarity and further of a superior dispersion stability there may be no special necessity of adding a polarity controlling agent such as lecithin, metallic soap, linseed oil or higher fatty acid.

The developer according to the present invention, which as mentioned above, does not cause any sedimentation of the toner even when left standing within the copying machine for a long period of time and does not change in the carrier liquid with the lapse of time (which, for instance, is superior in controlling the polarity of pigment or dye particles and capable of finely dispersing pigment particles), is exceedingly superior in gradient and resolving power of copies. Therefore, the liquid developer of the present invention is optimum for use in color copying, offset printing, charge transfer, press transfer, magnetic transfer, etc.

This seems to be attributable to the use of the resin obtained by copolymerizing a polarized monomer partially with a monomer capable of solvation with the nonaqueous solvent after polymerization, and further grafting a monomer, which is capable of adsorption and controlling the polarity of the toner, upon the polarized polymer area. This graft resin may not only contribute to the fixability on papers but also improve the transparency of the toner which is indispensably required at the time of color overlapping in the color copying process.

DESCRIPTION OF THE PREFERRED EMBODIMENTS

Example 1

| | |
|---|---|
| Phthalocyanine Blue | 500 g |
| Resinous dispersion obtained in Preparation Example-1 (solid content: 35.2%) | 1,000 g |
| Isooctane | 520 g |

A concentrated toner was prepared by dispersing the above composition for 10 hours by means of an attritor. 50 g of the resulting toner was dispersed in 2 l of isooctane to thereby prepare a toner for use in color copying.

A copied image was formed using this developer by means of Ricoh Color Copying Machine RC-1000. This image showed that its gradation property could achieve the gradation of up to 10 degrees and its resolving power was 10 lines/mm. And the average toner particle diameter was 0.21 μm, and could be made small and uniform as compared with that of conventional liquid toners.

Example 2

| | |
|---|---|
| Benzidine Yellow | 500 g |
| Resinous dispersion obtained in Preparation Example-2 (solid content: 32.0%) | 940 g |
| Isooctane | 550 g |

A concentrated toner was prepared by dispersing the above composition for 12 hours by means of an attritor. 35 g of the resulting toner was dispersed in 2 l of isooctane to thereby prepare a toner for use in color copying.

A copied image was formed using this developer by means of Ricoh Color Copying Machine RC-1000. This image showed the gradation of 9 degrees and the resolving power of 8.6 lines/mm. Additionally, the toner particle diameter could be reduced to 0.14 μm.

Example 3

| | |
|---|---|
| Rose bengale (produced by TOKYO KASEI K.K.) | 35 g |
| Resinous dispersion obtained in Preparation Example-6 (solid content: 96.9%) | 500 g |
| Isooctane | 1,000 g |

A concentrated toner was prepared by dispersing the above composition for 3 hours by means of a colloid mill. 50 g of the resulting toner was dispersed in 2 l of isooctane to thereby prepare a toner for use in color copying.

A copied image was formed using this developer by means of Ricoh Color Copying Machine RC-1000. This image showed the gradation of 9 degrees and the resolving power of 9.0 lines/mm. In addition thereto, the toner particle diameter was 0.16 μm.

Example 4

| | |
|---|---|
| Carbon MA-11 (produced by Mitsubishi Carbon K.K.) | 100 g |
| Resinous dispersion obtained in Preparation Example-3 (solid content: 34.6%) | 500 g |
| Isooctane | 500 g |

A concentrated toner was prepared by dispersing the above composition for 4 hours by means of a ball mill. 50 g of the resulting toner was dispersed in 2 l of isooctane to thereby prepare a toner for use in color copying.

A copied image was formed using this developer by means of Ricoh Color Copying Machine RC-1000. This image showed the gradation of 11 degrees and the resolving power of 9.0 lines/mm. Additionally, the toner particle diameter was 0.10 μm.

Example 5

| | |
|---|---|
| Carbon MA-11 (produced by Mitsubishi Carbon K.K.) | 100 g |
| Phthalocyanine Blue (produced by Toyo Ink K.K.) | 10 g |
| Rose bengale | 3 g |
| Resinous dispersion obtained in Preparation Example-4 (solid content: 34.1%) | 280 g |
| Vinyl toluene/isobutyl methacrylate =5/5 copolymer | 250 g |
| Isopar H (isoparaffin type solvent produced by Exxon Company) | 1,000 g |

A concentrated toner was prepared by dispersing the above composition for 10 hours by means of a attritor. 38 g of the resulting toner was dispersed in 2 l of Isopar H to thereby prepare a toner for obtaining black and white copies.

A copied image was formed using this developer by means of RICOPY 250 (manufactured by Ricoh Co. Ltd.). This image showed the gradation of 11 degrees, the resolving power of 10 lines/mm, and the image density of 1.29. Additionally, the toner particle diameter was 0.10 μm.

Example 6

| | |
|---|---|
| zinc oxide SAZEX 4000 (produced by SAKAI KAGAKU K.K.) | 100 g |
| Resinous dispersion obtained in Preparation Example-5 (solid content: 52.8%) | 500 g |
| Isooctane | 1,000 g |

A concentrated toner was prepared by dispersing the above composition for 10 hours by means of an attritor. 100 g of the resulting toner was dispersed in 2 l of isooctane to thereby prepare a toner for obtaining black and white copies. A copied image was formed using this developer by means of RICOPY 250. This image showed the gradation of 9 degrees and the resolving power of 8 lines/mm. Additionally, the toner particle diameter was 0.21 μm.

EXAMPLE 7

| | |
|---|---|
| Carbon MA-11 | 100 g |

-continued

| | |
|---|---|
| (produced by MITSUBISHI CARBON K.K.) | |
| Resinous dispersion obtained in Preparation Example-3 (solid content: 34.6%) | 820 g |
| Isooctane | 500 g |

A concentrated toner was prepared by dispersing the above composition for 20 hours by means of a ball mill. 100 g of the resulting toner was dispersed in 2 l of isooctane. Copying was effected using the resulting toner by means of RICOPY DT-1200 (manufactured by Ricoh Co. Ltd.) used for transfer of image onto a common paper. The thus copied image showed the image density of 1.20, the resolving power of 7.8 lines/mm and the gradation of 8 degrees, and additionally was proved superior in re-dispersibility.

Example 8

| | |
|---|---|
| Tri-iron tetroxide | 100 g |
| Resinous dispersion obtained in Preparation Example-4 (solid content: 34.1%) | 520 g |
| Isooctane | 500 g |

A concentrated toner was prepared by dispersing the above composition for 20 hours by means of a ball mill. 200 g of the resulting toner was dispersed in 2 l of isooctane. Magnetic development and transfer were effected by using the resulting toner. The thus obtained image showed the results: image density 1.10, resolving power 6.8 lines/mm, gradation 5 degrees, and toner particle diameter 3.2 μm.

What is claimed is:

1. A liquid developer for use in electrophotography which comprises a carrier liquid which is a non-aqueous solvent having a high insulating property and a low dielectric constant, said carrier liquid having particles of pigment or dye and a resin dispersed therein, wherein said resin consists essentially of resin obtained by preparing a copolymer by copolymerizing a first monomer having the formula $$CH_2=\overset{\overset{\displaystyle R}{|}}{C}-X,$$

wherein R is —H or —$CH_3$ and X is phenyl, methylphenyl, —$COOC_nH_{2n+1}$($1 \leq n \leq 20$) or —$COOC_2H_4N(C_mH_{2m+1})_2$($1 \leq m \leq 5$), with a second monomer selected from the group consisting of a monomer having a glycidyl group, an unsaturated carboxylic acid and an anhydride thereof, then graft copolymerizing said copolymer with a third monomer wherein said third monomer is said unsaturated carboxylic acid or anhydride thereof when said second monomer is said monomer having a glycidyl group and said third monomer is said monomer having a glycidyl group when said second monomer is said unsaturated carboxylic acid or anhydride thereof.

2. A liquid developer according to claim 1 wherein the monomer having a glycidyl group is glycidyl methacrylate or glycidyl acrylate.

3. A liquid developer according to claim 1 or claim 2 wherein the unsaturated carboxylic acid or its anhydride is one member selected from the group consisting of acrylic acid, methacrylic acid, itaconic acid, crotonic acid, maleic acid, maleic anhydride, and dodecyl succinic anhydride.

4. A liquid developer according to claim 1 wherein the weight ratio of said first monomer: said second monomer is 99.9–80:0.1–20, and the weight ratio of said copolymer: said third monomer is 100:0.1–20.

5. A liquid developer for use in electrophotography which consists essentially of: a non-aqueous carrier liquid having a high insulating property and a low dielectric constant, pigment or dye particles dispersed in said carrier liquid, and a resin dispersion dispersed in said carrier liquid, said resin dispersion consisting essentially of said non-aqueous solvent having dispersed therein a graft copolymer prepared by copolymerizing a first monomer having a formula $$CH_2=\overset{\overset{\displaystyle R}{|}}{C}-X$$

wherein R is H or $CH_3$ and X is phenyl, methylphenyl, $COOC_nH_{2n+1}$ wherein n is an integer from 1 to 20, or $COOC_2H_4N(C_mH_{2m+1})_2$ wherein m is an integer from 1 to 5, with either (2) glycidyl acrylate or glycidyl methacrylate or (3) unsaturated carboxylic acid or anhydride thereof, wherein the weight ratio of (1):(2) or (3) is from 99.9–80:0.1–20, to obtain a copolymer, then graft polymerizing said copolymer with either (i) unsaturated carboxylic acid or anhydride thereof when said copolymer has been prepared using glycidyl acrylate or glycidyl methacrylate or (ii) glycidyl acrylate or glycidyl methacrylate when said copolymer has been prepared using said unsaturated carboxylic acid or anhydride thereof, wherein the weight ratio of (i) or (ii) to said copolymer is 0.1–20:100, the graft polymerizing step being carried out at a temperature of from 70° to 150° C., in the presence of a grafting catalyst selected from the group consisting of sulfuric acid, paratoluene sulfonic acid and tertiary amine compound.

6. A liquid developer as claimed in claim 5 in which, in said first monomer, X is phenyl or methylphenyl.

7. A liquid developer as claimed in claim 5 in which, in said first monomer, X is $COOC_nH_{2n+1}$.

8. A liquid developer as claimed in claim 5 in which, in said first monomer, X is $COOC_2H_4N(C_mH_{2m+1})_2$.

* * * * *